March 17, 1964  KEINOSUKE KAJI  3,124,841
INJECTION MOLDING MACHINE OF THERMOPLASTICS
Filed Feb. 20, 1961
Fig.1
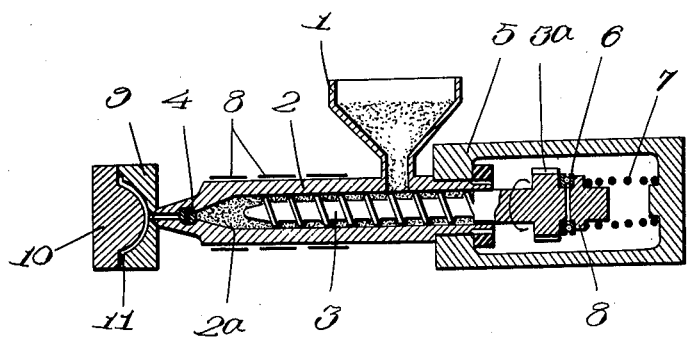
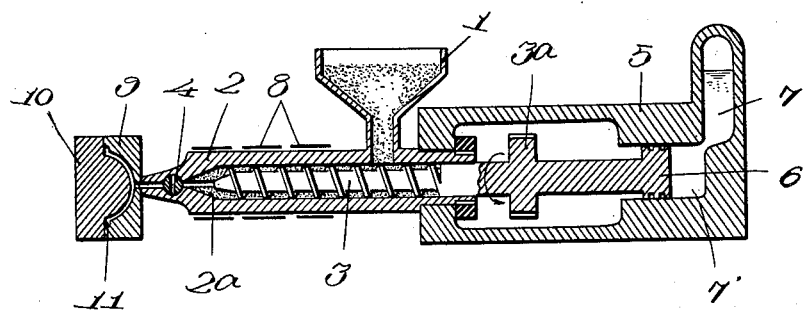
Fig.2

United States Patent Office 3,124,841
Patented Mar. 17, 1964

3,124,841
INJECTION MOLDING MACHINE OF
THERMOPLASTICS
Keinosuke Kaji, 38 Aza-Ganjiyama, Oobu-cho,
Chita-gun, Japan
Filed Feb. 20, 1961, Ser. No. 90,443
Claims priority, application Japan Apr. 21, 1960
3 Claims. (Cl. 18—30)

The present invention is related to an injection molding machine for thermoplastics. More particularly the invention relates to an injection molding machine in which the pressure energy of material caused by the rotation of a screw shaft is accumulated and such accumulated pressure energy is released in the injection process to carry out the injection molding.

In the conventional injection molding machines, whether of plunger or screw type, the motive power required for injection of material is supplied either by a liquid pressure piston or a mechanical device which makes reciprocating movement.

It is an object of the present invention to provide an injection molding machine which can be operated continuously without causing a stagnation and/or over-heating of the material to be molded.

It is another object of the present invention to provide an injection molding machine which can inject at an explosive velocity and can mold extremely thin moldings by means of the so-called impact molding.

It is a further object of the present invention to provide an injection molding machine which can mold far more quickly than any of the conventional machines.

With the above recited and other objects in view, reference is had to the following specification and drawing in which there are exhibited examples of the invention which are in no way intended as a limitation upon the scope of the appended claims as it is to be clearly understood that variations and modifications which fairly fall within the true scope of said claims may be resorted to when found expedient.

In the accompanying drawing forming a part of this specification, preferred forms and manners in which the invention may be embodied and practised are indicated, but without limiting the claimed invention to such illustration instance:

FIG. 1 is a vertical section showing the principal part including a heating cylinder of an injection molding machine according to the present invention; and FIG. 2 is the same showing another embodiment of the present invention.

Now explaining the present invention in detail with reference to the attached drawing, thermoplastic material which is fed through a hopper 1 is pushed forward within a heating cylinder 2 by means of a screw shaft 3 which is rotated in the direction as shown by the arrow. The material is heated and melted by a heater 8 as well as by the heat generated by the friction caused by the rotation of the screw shaft 3. Said screw shaft 3 is rotated by an electric motor through a gear 3a which is integral with said screw shaft and a suitable speed-limiting device is provided thereto. 6 is a thrust collar and supports the thrust of said screw shaft elastically against a frame 5 by means of a spring 7. When the screw shaft 3 is rotated while a cock 4 is left closed, the pressure of molten material, which is to be pushed into a hollow space 2a provided at the top or end of the cylinder 2 pushes, the screw shaft 3 backwards (to the right in the drawing) against the tension of the spring 7. After a pre-determined retreat of the screw, 3, namely when the material pushed into the hollow space 2a reaches a pre-determined amount, the cock 4 is opened by a suitable mechanism (not shown) which mechanism is interlocked with the opening and closing of molding dies 9 and 10. The mechanism may operate electrically, mechanically or by means of liquid or gaseous pressure and the material is injected under the pressure into a cavity 11 constituted by the molding dies 9 and 10. The molding dies 9 and 10 are then cooled by the conventional method known in the usual injection molding and the molding dies are opened and the molding is removed. Thus the injection molding is carried out continuously by repeating the above described process.

As shown in FIG. 2, said thrust collar 6 and the spring 7 can be replaced with a thrust collar and a piston 6' (which is constructed integrally with said screw shaft 3) provided in opposition to the pressure of a hollow space 7' of a cylinder which is connected with the liquid pressure of an air reservoir 7. Instead of the air reservoir 7, a balance-weight accumulator may also be used. Furthermore, the same object can be attained by the use of gas alone without depending upon liquid. It goes without saying that in the above described devices utilizing liquid or gas, valves, pipes, pressure gauges, refilling pumps and safety devices, though they are not shown in the attached drawing, should be provided wherever necessary. Moreover, various devices preventing the back flow of the material by the pressure may be equipped without departing from the scope of the present invention.

According to the present invention as disclosed above, the injection of the material is carried out by releasing the pressure energy generated by the rotation of the screw shaft itself which is accumulated by means of a spring, air reservoir or the like. This is an improvement over the positive injection motion attained by means of a liquid pressure cylinder or a device utilizing mechanical reciprocating motion as used in the conventional methods of injection. Furthermore, as the material is always placed under the substantially constant pressure, by adjusting the amount of supply of the material in proportion to the amount of injection or by regulating the rotation of the screw shaft, the screw shaft can be operated continuously keeping the molten material under the perfect condition for the injection molding. As is well known, chemical material such as thermoplastics and the like are apt to be resolved and deteriorated when the same is subjected to stagnation, over-heating and similar conditions. It is necessary to place every particle of the material under a stabilized, constant flow and to subject it to a dynamically uniform treatment (amount and time of heating in this case) and if the material is not melted uniformly by an unavoidable reason, it must be mixed and melted properly and no unmelted portion should be left in the material. Thus, to operate the screw shaft continuously as in the present invention becomes highly significant.

Furthermore, according to the present invention, an extremely high injection velocity can be obtained, even an explosive injection velocity. Thus the so-called impact molding of extremely thin moldings can easily be carried out by the machine according to the present invention.

Moreover, as in the machine according to the present invention, the material supply device is operated automatically, the molten material which is maintained under the optimum condition for injection is available inexhaustibly from time to time ready for injection into the molding dies and the molding operation can be carried out extremely easily. Thus, the machine can be operated simply by opening and closing the cock or valve 4. This also makes the control of the machine extremely easy and the time required for the molding can be reduced to the minimum, thus making it possible to obtain an extremely high molding cycle ever known to the art. While the highest molding cycle of the conventional machines has been 1,000 cycles per hour as is understood by the applicant, the machine according to the present invention can be operated at very high velocity of 7,000–8,000 cycles per hour.

Having thus fully described my invention, what I claim as new and desire to secure by U.S. Letters Patent is:

1. An injection molding device consisting of a cylinder having a discharge opening at one end, means for delivering material to be injected connected to said cylinder at a spaced location from the discharge opening, a rotatable and reciprocable screw in said cylinder having means thereon effective upon rotation thereof to feed material from said means for delivering material to be injected to said discharge opening, valve means for opening and closing said discharge opening, pressure accumulator means opposing movement of said screw in a direction away from said discharge said screw and said pressure accommodation means being disposed so that when material is fed by rotation of said screw toward said discharge to cause, when said opening is closed, a build up of pressure ahead of said screw which urges said screw in a direction to act on said pressure accumulator means, said pressure accumulator means being of a construction and arrangement to cause a build up of a force sufficient to drive said screw toward said discharge and in proportion to the rotation of said screw the force being effective to drive said screw toward said discharge when said opening is opened by said valve means, and means to rotate said screw.

2. An injection molding device according to claim 1, wherein said pressure accumulator means includes a spring urging said screw in a direction toward said discharge opening.

3. An injection molding device according to claim 1, wherein said pressure accumulator means includes a liquid and air reservoir, said screw having a piston at an end thereof acting on the liquid and air reservoir to compress the same during the build up of pressure between said screw and said discharge opening.

References Cited in the file of this patent

UNITED STATES PATENTS

| | | |
|---|---|---|
| 1,533,191 | Kaiser et al. | Apr. 14, 1925 |
| 2,734,226 | Willert | Feb. 14, 1956 |
| 2,996,756 | Korsch et al. | Aug. 22, 1961 |